(12) United States Patent
Laursen et al.

(10) Patent No.: US 7,300,308 B2
(45) Date of Patent: Nov. 27, 2007

(54) PATCH PANEL

(75) Inventors: Erik Laursen, Kirkland, WA (US); John Redfield, Brier, WA (US); George C. Rondeau, Jr., Sammamish, WA (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 11/530,788

(22) Filed: Sep. 11, 2006

(65) Prior Publication Data

US 2007/0196071 A1    Aug. 23, 2007

Related U.S. Application Data

(60) Provisional application No. 60/715,842, filed on Sep. 9, 2005.

(51) Int. Cl.
*H01R 13/60* (2006.01)

(52) U.S. Cl. .................................. 439/540.1

(58) Field of Classification Search ............ 439/540.1, 439/43, 49, 532
See application file for complete search history.

(56) References Cited

U.S. PATENT DOCUMENTS

| | | | |
|---|---|---|---|
| 5,127,082 A | 6/1992 | Below et al. | |
| 5,129,842 A * | 7/1992 | Morgan et al. | 439/532 |
| 5,167,530 A | 12/1992 | Wallgren et al. | |
| D411,515 S | 6/1999 | Tulley | |
| 6,273,752 B1 | 8/2001 | Martin et al. | |
| 6,537,106 B1 | 3/2003 | Follingstad | |
| 6,761,583 B2 | 7/2004 | Ortowski et al. | |
| 6,866,541 B2 | 3/2005 | Barker et al. | |
| 6,916,199 B2 | 7/2005 | Follingstad | |
| 6,918,786 B2 * | 7/2005 | Barker et al. | 439/540.1 |
| 6,971,909 B2 | 12/2005 | Levesque et al. | |
| 6,981,893 B2 | 1/2006 | Barker et al. | |
| 7,094,095 B1 | 8/2006 | Caveney | |
| 7,179,119 B2 * | 2/2007 | Follingstad | 439/534 |
| 7,207,835 B2 * | 4/2007 | Levesque et al. | 439/540.1 |
| 7,220,145 B2 * | 5/2007 | Denovich et al. | 439/540.1 |

(Continued)

*Primary Examiner*—Phuong Dinh
(74) *Attorney, Agent, or Firm*—Davis Wright Tremaine LLP; George C. Rondeau, Jr.

(57) ABSTRACT

An angled patch panel having left and right end panel sections and left and right central panel sections, each section having at least one connector mounting aperture. The left central panel section and left end panel section being attached together at an angle other than 180 degrees, and the right central panel section and right end panel section being attached together at an angle other than 180 degrees. The patch panel includes left and right mounting plates, and left and right end rearwardly extending extension plates. The left end panel section extends from the left end extension plate inwardly and forwardly and terminates at a first forward position facing toward the left side, and the right end panel section extends from the right end extension plate inwardly and forwardly and terminating at a second forward position facing toward the right side, and the left central panel section extends from the left end panel section inwardly and forwardly and terminates at a third forward position facing toward the left side, and the right central panel section extends from the right end panel section inwardly and forwardly and terminates at a fourth forward position facing toward the right side. The third forward position being forward of the first forward position, and the fourth forward position being forward of the second forward position.

23 Claims, 8 Drawing Sheets

U.S. PATENT DOCUMENTS

| | | | |
|---|---|---|---|
| 7,244,144 B2 * | 7/2007 | Follingstad | 438/534 |
| 2004/0219829 A1 | 11/2004 | Clark et al. | |
| 2005/0041947 A1 | 2/2005 | Barker et al. | |
| 2005/0191901 A1 * | 9/2005 | Follingstad | 439/534 |
| 2006/0118321 A1 | 6/2006 | Herring et al. | |
| 2006/0194470 A1 | 8/2006 | Caveney et al. | |
| 2006/0194471 A1 | 8/2006 | Clark et al. | |

* cited by examiner

PATCH PANEL

CROSS REFERENCE TO RELATED APPLICATION(S)

This application claims priority benefit of provisional application Ser. No. 60/715,842 filed Sep. 9, 2005.

BACKGROUND OF THE INVENTION

1. Field of the Invention

Generally, the present invention relates to cable management devices for network equipment racks. In particular, the invention relates to an angled patch panel.

2. Description of the Related Art

A patch panel is useful as a support panel for mounting reconfigurable ports for patching components in a network rack. It is desirable to orient the connectors mounted to the patch panel so that the cables extending therefrom extend somewhat toward the left or right side when exiting connectors supported by the patch panel and do not require a 90 degree bend as with a flat patch panel. Angled patch panels such as shown in U.S. Pat. No. 6,866,541 and U.S. Pat. No. 6,971,909 are helpful in this regard, although leave room for improvements.

BRIEF DESCRIPTION OF THE SEVERAL VIEWS OF THE DRAWING(S)

DETAILED DESCRIPTION OF THE INVENTION

Figure 1:
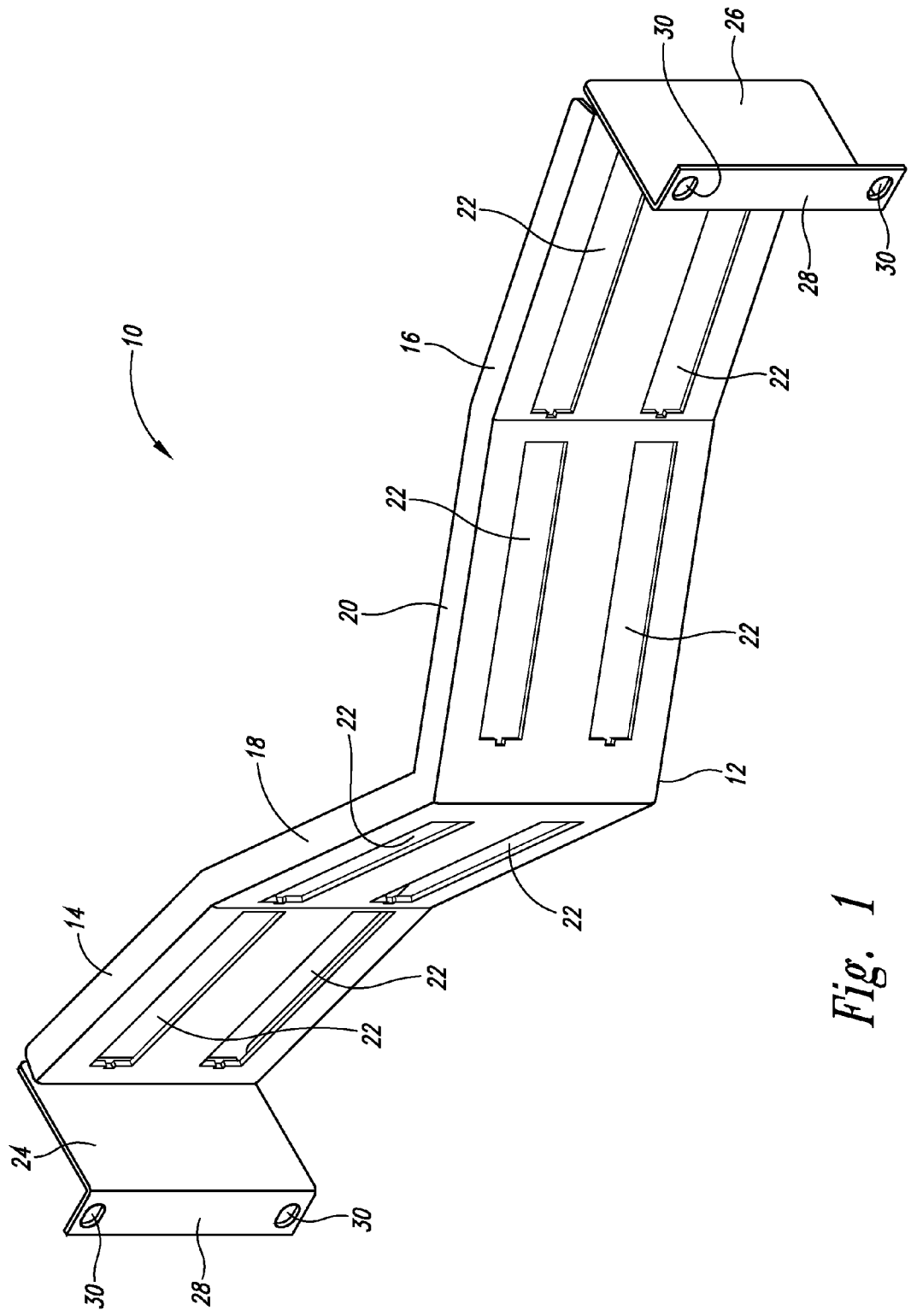
FIG. 1 is a front perspective view of an angled patch panel according to the present invention.
Figure 2:
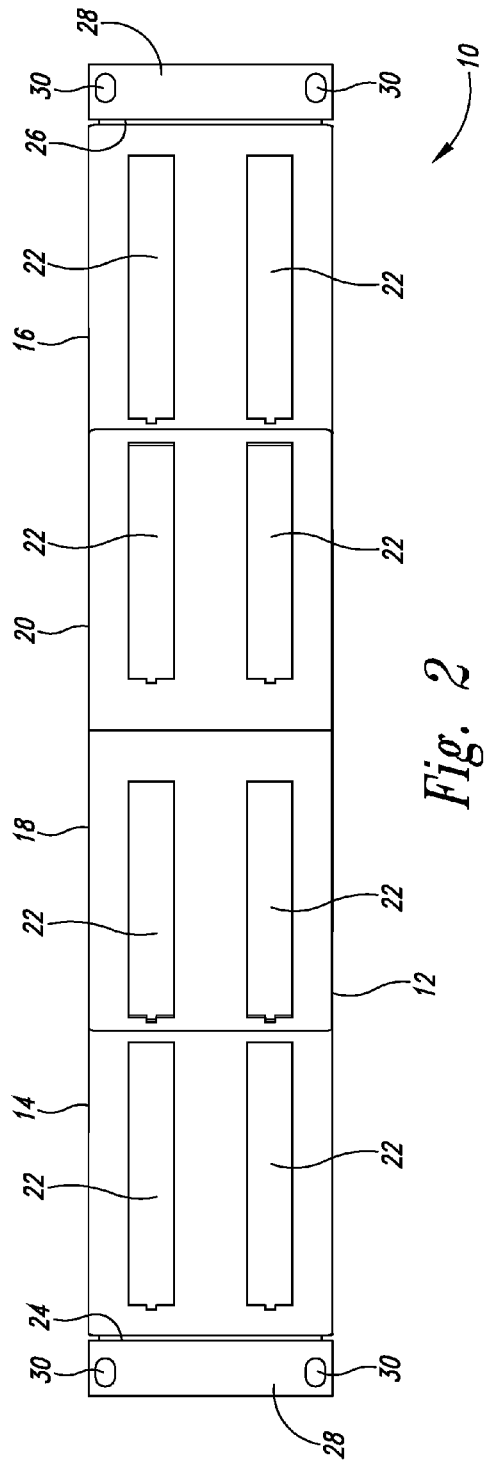
FIG. 2 is a front elevational view of the patch panel.
Figure 3:
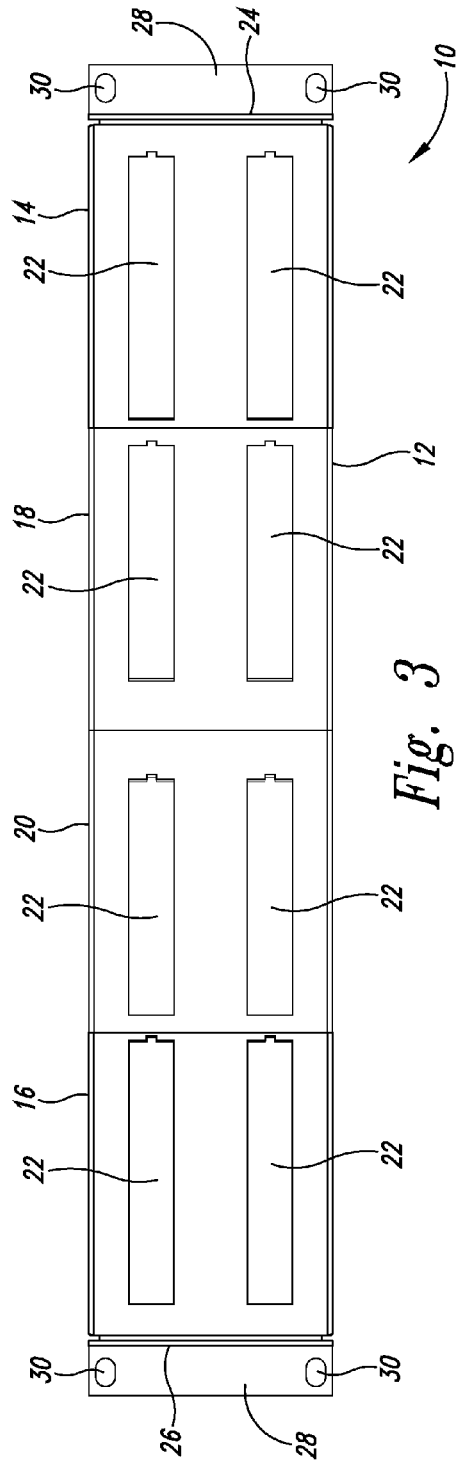
FIG. 3 is a rear elevational view of the patch panel.

A patch panel 10 according to an embodiment of the invention is useful in providing a support panel for mounting reconfigurable ports for patching components in a network rack.

The patch panel 10 includes an outwardly angled central frame 12 having left and right flat end panel sections 14 and 16, and left and right flat central panel sections 18 and 20. Each of the panel sections 14-20 has a pair of mounting apertures 22 for mounting of a plurality of connectors 23 therein (shown mounted in FIGS. 9-11). The patch panel 10 further includes left and right end plates 24 and 26, respectively, with the left end plate rigidly attached to the left end of the left end panel section 14 and the right end plate rigidly attached to the right end of the right end panel section 16. Each end plate 24 and 26 has a mounting plate 28 with a pair of mounting apertures 30 for attaching the patch panel 10 to an electronics equipment rack (not shown). The mounting plates 28 are for mounting to the front face of the rack vertical rails.

The left and right end panel sections 14 and 16 are positioned to the left and right of the left and right central panel sections 18 and 20, respectively. The right end of the left end panel section 14 is rigidly attached to the left end of the left central panel section 18, and the left end of the right end panel section 16 is rigidly attached to the right end of the right central panel section 20. The right end of the left central panel section 18 is rigidly attached to the left end of the right central panel section 20. In the illustrated embodiment the panel sections 14-20 are integrally formed as a single piece, preferably formed of a suitable material, such as metal; however, the panel sections may be formed of any suitable rigid material, such as many plastics or composites, and may be formed as separate pieces rigidly attached together.

The left end plate 24 is rigidly attached to the left end of the left end panel section 14, and the right end plate 26 is rigidly attached to the right end of the right end panel section 16. In the illustrated embodiment, the left and right end plates 24 and 26 are riveted to the respective left and right end panel sections 14 and 16. The mounting plate 28 for each of the left and right end plates 24 and 26 are rigidly attached thereto, and in the illustrated embodiment formed as a single piece with the respective end plate, preferably formed of a suitable material, such as metal. The left and right end plates 24 and 26 are arranged in spaced apart forwardly oriented parallel planes.

Figure 4:
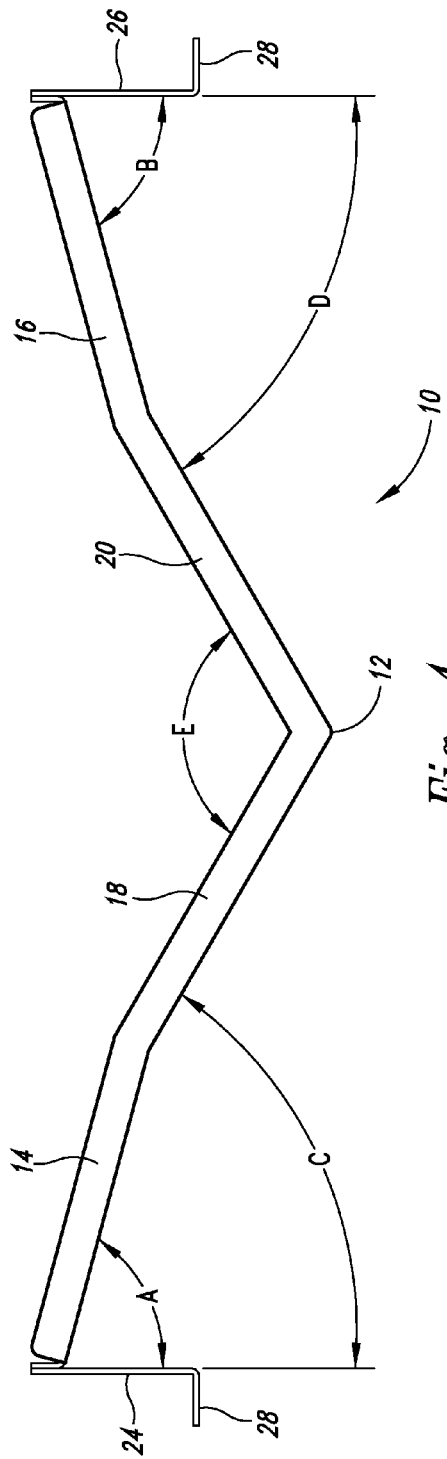
FIG. 4 is a top plan view of the patch panel.
Figure 5:
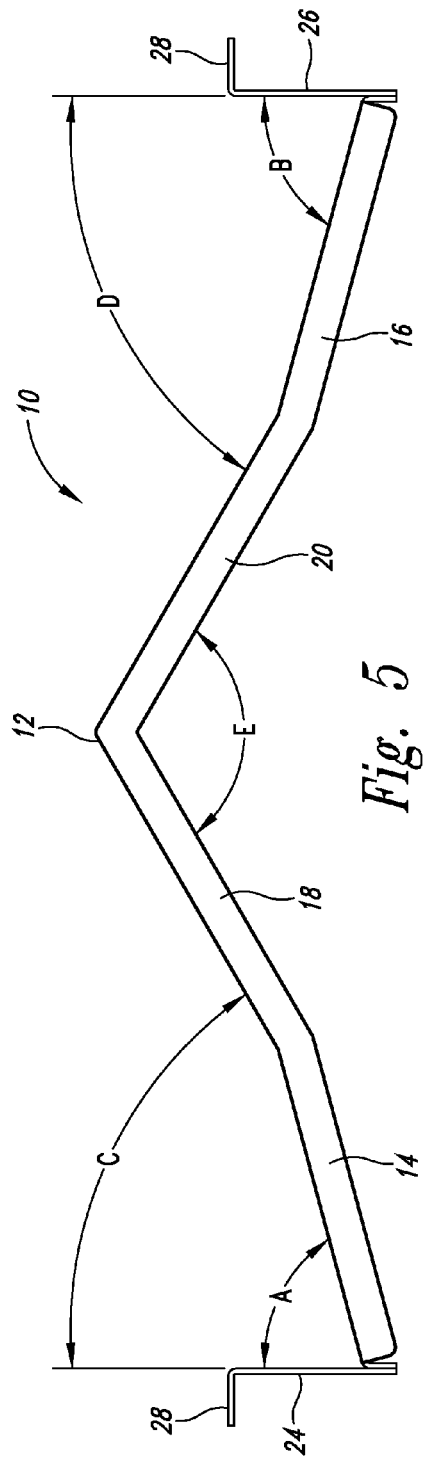
FIG. 5 is a bottom plan view of the patch panel.
Figure 7:
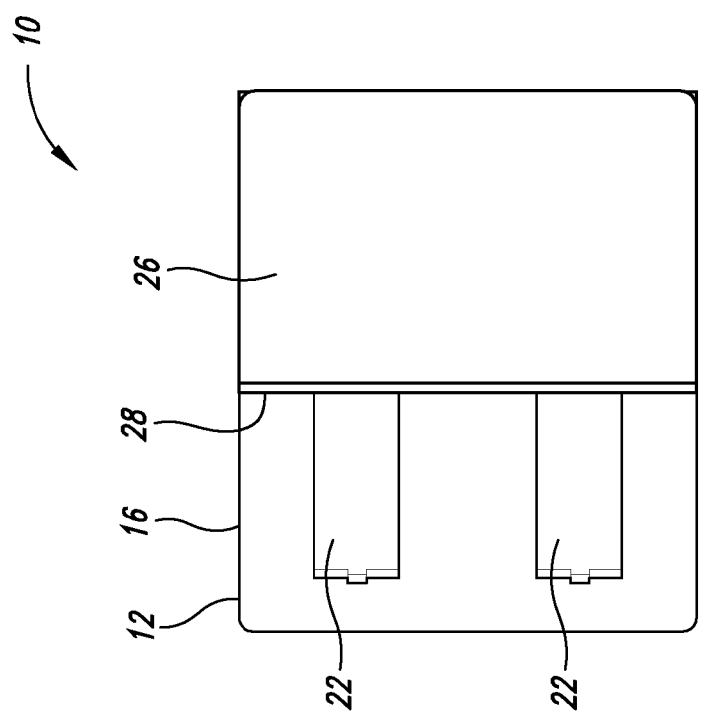
FIG. 7 is a right side elevational view of the patch panel.
Figure 6:
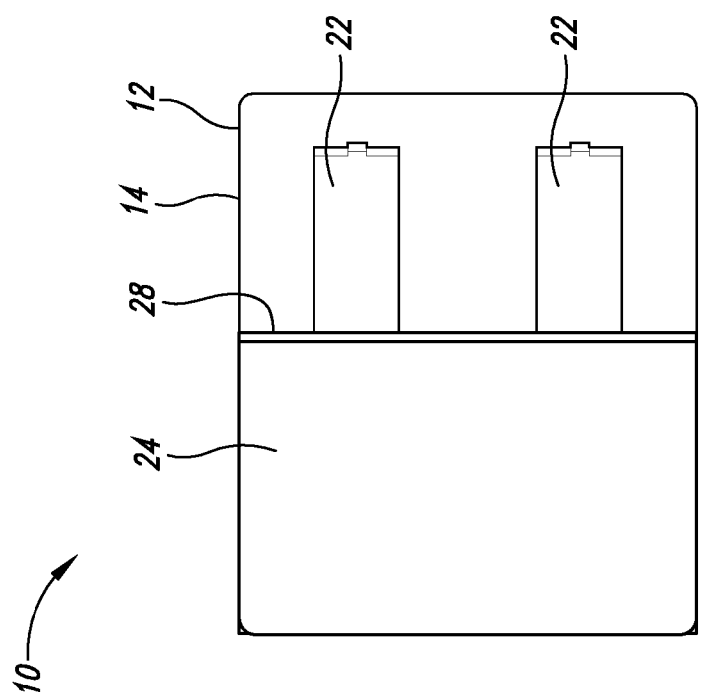
FIG. 6 is a left side elevational view of the patch panel.
Figure 8:
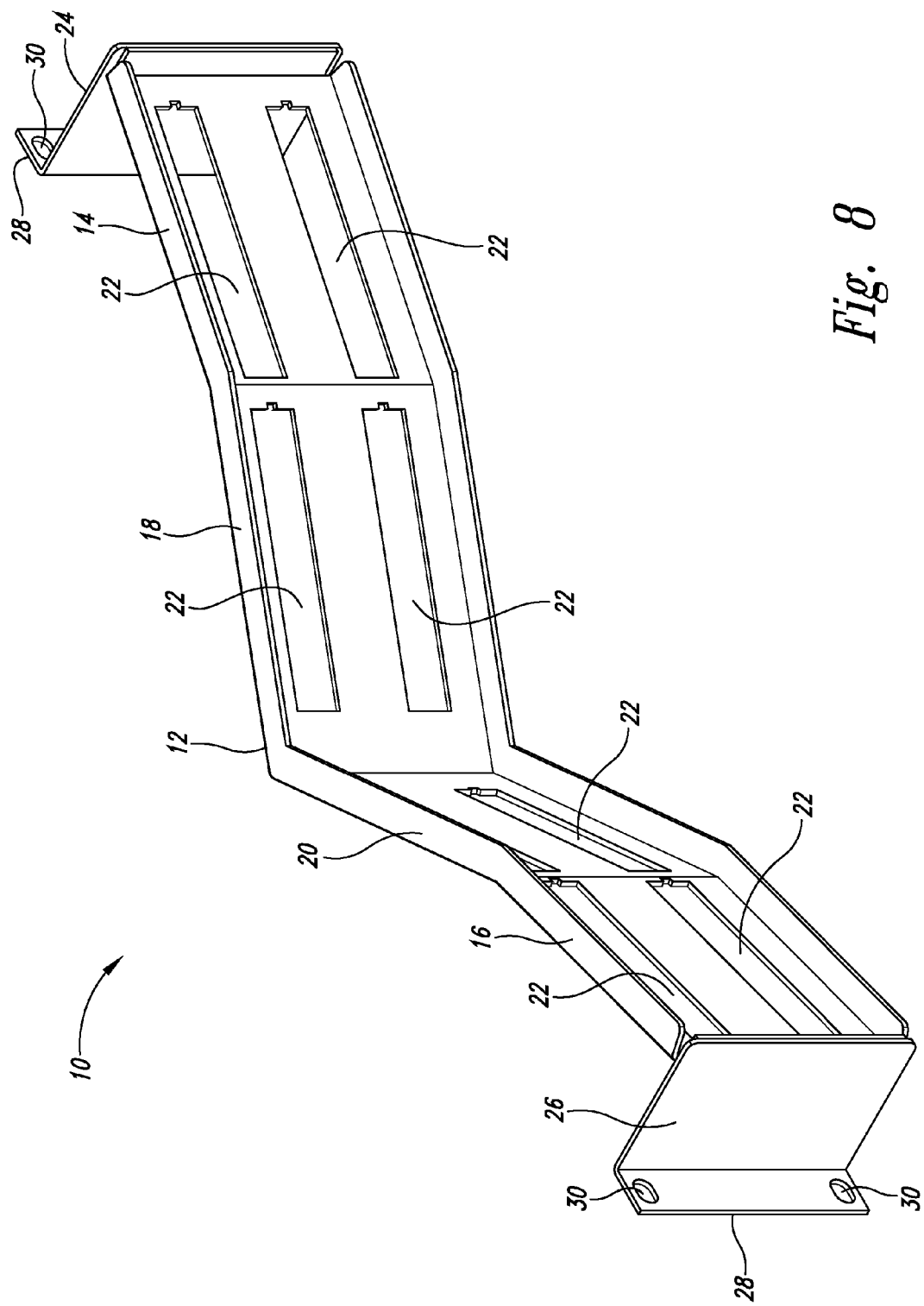
FIG. 8 is a rear perspective view of the patch panel.

With the mounting plates 28 attached to the front face of the left and right rails of a rack, the left and right end plates 24 and 26 project rearwardly toward the rear of the rack. The left and right end panel sections 14 and 16 project from the left and right end plates 24 and 26, respectively, inwardly and forwardly, and terminate at a forward position rearward of a plane defined by the mounting plates 28. As shown in FIG. 4, the left end panel section 14 is at an angle A relative to the left end plate 24 so as to face somewhat toward the left and thereby orient the connectors 23 (shown mounted thereto in FIGS. 9-11) positioned in the mounting apertures 22 of the left end panel section facing to the left, and the right end panel section 16 is at an angle B relative to the right end plate 26 so as to face somewhat toward the right and thereby orient the connectors 23 (shown mounted thereto in FIGS. 9-11) positioned in the mounting apertures 22 of the right end panel section facing to the right.

The left and right central panel sections 18 and 20 project from the left and right panel sections 14 and 16, respectively, inwardly and forwardly, and terminate at a forward position forward of the plane defined by the mounting plates 28 and have a forwardly pointing, generally V-shape. As shown in FIG. 4, the left central panel section 18 is at an angle C relative to the left end plate 24 so as to face somewhat toward the left and thereby orient the connectors 23 (shown mounted thereto in FIGS. 9-11) positioned in the mounting apertures 22 of the left central panel section facing to the left, and the right central panel section 20 is at an angle D relative to the right end plate 26 so as to face somewhat toward the right and thereby orient the connectors 23 (shown mounted thereto in FIGS. 9-11) positioned in the mounting apertures 22 of the right central panel section facing to the right. The angle C is selected to be greater than the angle A so that the left central panel section 18 (and the connectors 23 mounted thereto) faces more to the left than the left end panel section 14 (and the connectors 23 mounted thereto). Similarly, the angle D is selected to be greater than the angle B so that the right central panel section 20 (and the connectors 23 mounted thereto) faces more to the right than the right end panel section 16 (and the connectors 23 mounted thereto). The left and right central panel sections 18 and 20 are at an interior angle E with respect to each other, as shown in FIG. 4.

The described arrangement tends to orient the connectors 23 mounted to the panel sections 14-20 so that the cables extending therefrom extend somewhat toward the left or right side when exiting the connectors and do not require a 90 degree bend and the associated cable support and control provided by a horizontal cable manager. This allows cables attached to the connectors 23 and extending from the front of the patch panel 10 to flow more directly to one or more vertical cable managers located adjacent the left and right ends of the patch panel at the left and right sides of the rack to which the patch panel is mounted. Additionally, this structure results in shorter patch cable length requirements since the distance traversed to the left and right sides of the rack is reduced compared to a flat patch panel design. The outwardly angled design of the patch panel 10 also provides increased space behind patch panel for housing the cables extending from the rear of the patch panel 10. The arrangement also reduces the amount the panel sections protrude forward of the plane defined by the mounting plates 28 and hence forward of the rack to which mounted. The recessed arrangement moves much of the panel sections 14-20 rearward of the plane defined by the mounting plates 28, hence the rear faces of the panel sections are closer to the rear of the rack to which the patch panel 10 is mounted, making access to the rear of the connectors 23 mounted to the patch panel from the rear of the rack easier.

In the illustrated embodiment, the angles A and B are about 75 degrees, and the angles C and D are about 60 degrees. The angle E is about 120 degrees.

The patch panel can occupy a single rack unit height or multiple rack unit heights.

Figure 9:
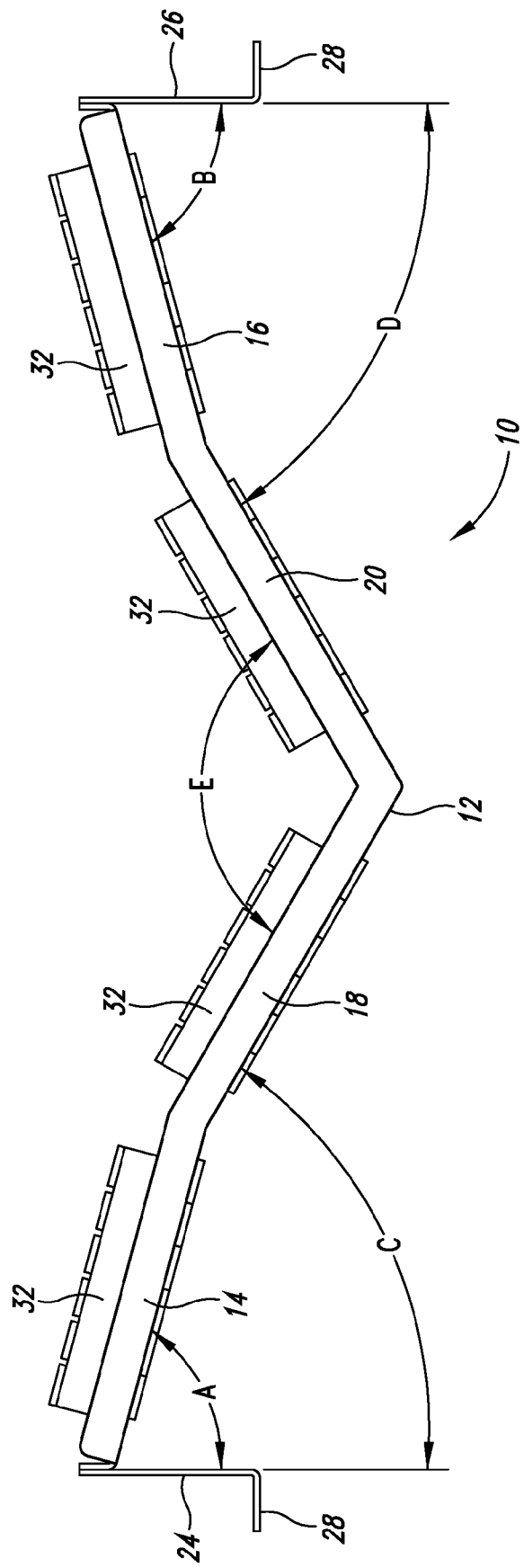
FIG. 9 is a top plan view of the patch panel with the connectors installed.
Figure 10:
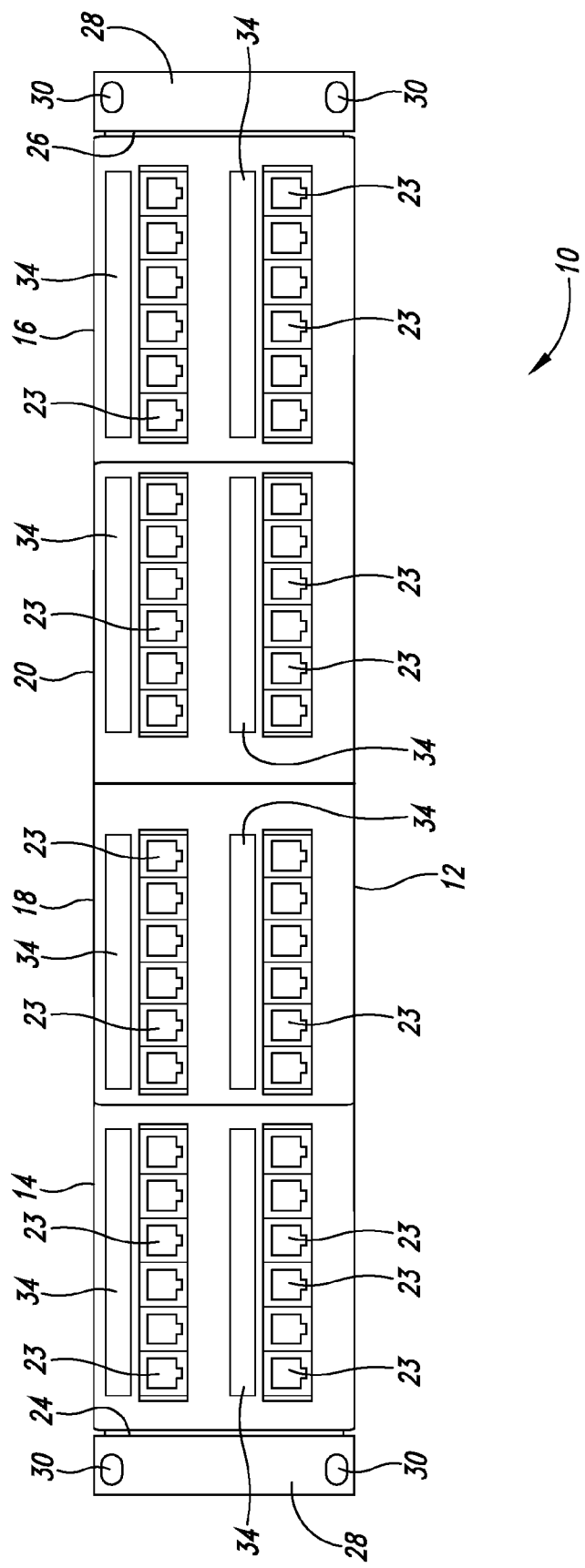
FIG. 10 is a front elevational view of the patch panel of FIG. 9.
Figure 11:
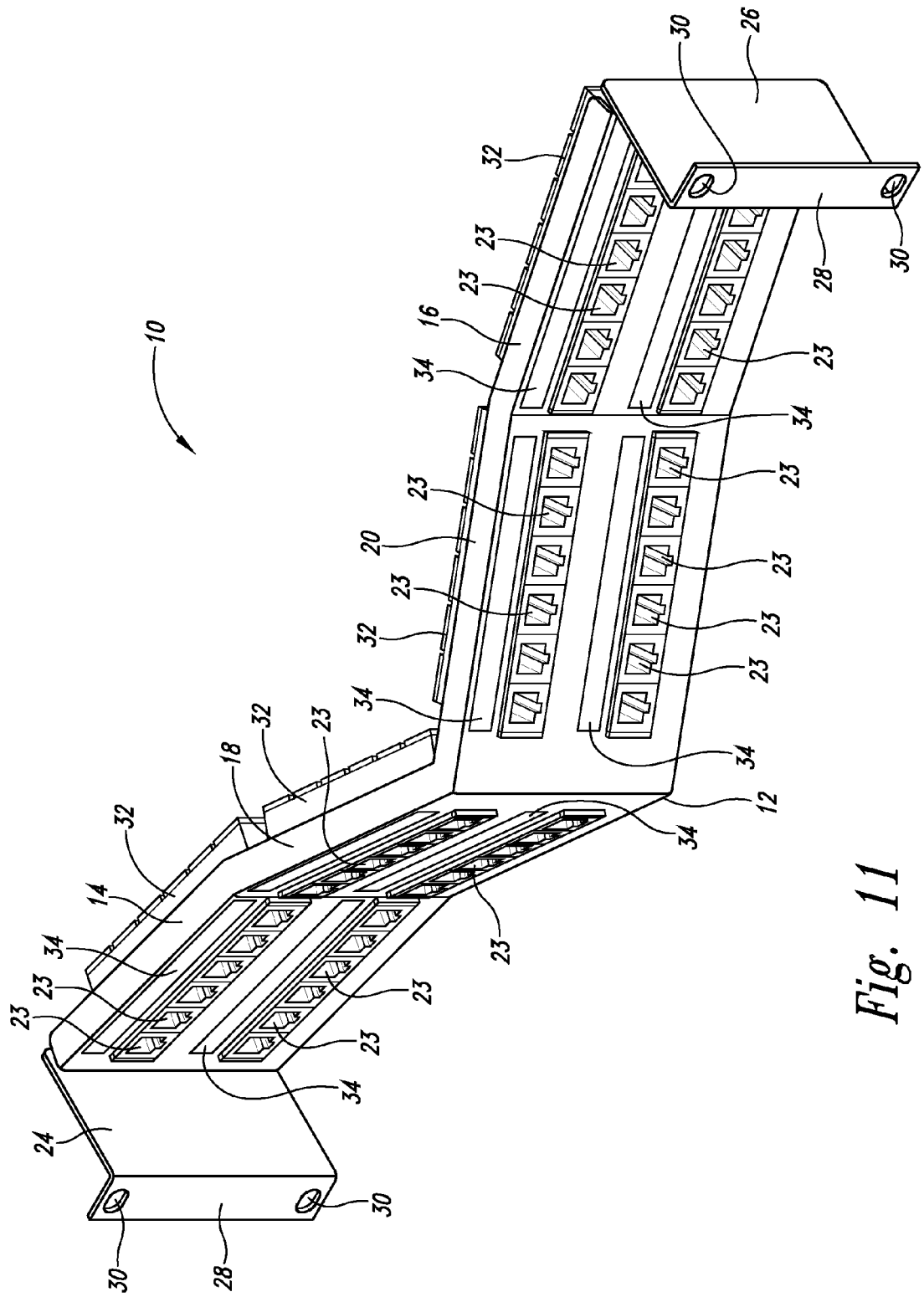
FIG. 11 is front perspective view of the patch panel of FIG. 9.

The connectors 23 are shown mounted to the patch panel 10 in FIGS. 9-11 positioned in the mounting apertures 22. As illustrated, the connectors 23 are typically mounted in insert modules 32 that are fitted into the mounting apertures 22. One insert module 32 may hold a number of connectors 23, such as 6 in a left-right linear arrangement, and is sized to fit within one of the mounting apertures 22 within which it is retained. In the illustrated embodiment with 8 mounting apertures 22, the patch panel 10 holds 8 insert modules 32 and hence a total of 48 connectors 23 (thus providing 48 ports). A name plate 34 may be mounted above each mounting aperture 22.

In accordance with the illustrated embodiment, an angled patch panel is shown mountable to a network rack having left and right side support members. The patch panel has left and right end panel sections, each having left and right ends and at least one connector mounting aperture, and left and right central panel sections, each having left and right ends and at least one connector mounting aperture. The left central panel section is positioned to the right of the left end panel section and the right central panel section is positioned to the left of the right end panel section. The left end of the left central panel section and the right end of the left end panel section are rigidly attached together and the right end of the right central panel section and the left end of the right end panel section being rigidly attached together. The right end of the left central panel section and the left end of the right central panel section are rigidly attached together at an angle less than 180 degrees measured on a rearward side thereof.

The illustrated patch panel includes left and right mounting plates, with the left mounting plate being configured for mounting to the left side support member of the network rack and the right mounting plate being configured for mounting to the right side support member of the network rack. The left and right mounting plates define a plane. The patch panel further includes left and right end extension plates, with the left end extension plate extending rearwardly from the left mounting plate to the left end of the left end panel section and being rigidly attached to the left mounting plate and to the left end of the left end panel section, and with the right end extension plate extending rearwardly from the right mounting plate to the right end of the right end panel section and being rigidly attached to the right mounting plate and to the right end of the right end panel section. The left end panel section extends from the left end extension plate inwardly and forwardly at a first angle relative to the left end extension plate measured on a forward side of the left end panel section and terminates at a forward position rearward of the plane so as to face toward the left side, and the right end panel section extends from the right end extension plate inwardly and forwardly at a second angle relative to the right end extension plate measured on a forward side of the right end panel section and terminates at a forward position rearward of the plane so as to face toward the right side. The left central panel section extends from the left end panel section inwardly and forwardly at a third angle relative to the left end extension plate measured on a forward side of the left central panel section and terminates at a forward position forward of the plane so as to face toward the left side, and the right central panel section extends from the right end panel section inwardly and forwardly at a fourth angle relative to the right end extension plate measured on a forward side of the right central panel section and terminates at a forward position forward of the plane so as to face toward the right side. The first angle is greater than the third angle, and the second angle is greater than the fourth angle.

It is desirable that the first angle and the second angle be at least 75 degrees but less than 90 degrees, and the third angle and the fourth angle not be greater than least 60 degrees. In the illustrated embodiment, the left and right end panel sections and the left and right central panel sections are formed from a unitary elongated element. Similarly, the left mounting plate and the left end extension plate are formed from a first unitary elongated element, and the right mounting plate and the right end extension plate are formed from a second unitary elongated element. It is also desirable that the angle between the left central panel section and the right central panel section be at least 120 degrees. In the illustrated embodiment, the connector mounting apertures of the left and right end panel sections and the left and right central panel sections are each configured to receive an insert module, and each of the insert modules is contains at least one connector and as illustrated may contain at least six linearly aligned connectors.

It will be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims filed and the equivalents thereof.

The invention claimed is:

1. An angled patch panel mountable to a network rack having left and right side support members, comprising:
   left and right end panel sections, each having left and right ends and at least one connector mounting aperture;
   left and right central panel sections, each having left and right ends and at least one connector mounting aperture, the left central panel section being positioned to the right of the left end panel section and the right central panel section being positioned to the left of the right end panel section, the left end of the left central panel section and the right end of the left end panel section being rigidly attached together and the right end of the right central panel section and the left end of the right end panel section being rigidly attached together, and the right end of the left central panel section and the left end of the right central panel section being rigidly attached together at an angle less than 180 degrees measured on a rearward side thereof;
   left and right mounting plates, the left mounting plate being configured for mounting to the left side support member of the network rack and the right mounting plate being configured for mounting to the right side support member of the network rack, the left and right mounting plates defining a plane; and
   left and right end extension plates, the left end extension plate extending rearwardly from the left mounting plate to the left end of the left end panel section and being rigidly attached to the left mounting plate and to the left end of the left end panel section, and the right end extension plate extending rearwardly from the right mounting plate to the right end of the right end panel section and being rigidly attached to the right mounting plate and to the right end of the right end panel section, the left end panel section extending from the left end extension plate inwardly and forwardly at a first angle relative to the left end extension plate measured on a forward side of the left end panel section and terminating at a forward position rearward of the plane so as to face toward the left side, and the right end panel section extending from the right end extension plate inwardly and forwardly at a second angle relative to the right end extension plate measured on a forward side of the right end panel section and terminating at a forward position rearward of the plane so as to face toward the right side, the left central panel section extending from the left end panel section inwardly and forwardly at a third angle relative to the left end extension plate measured on a forward side of the left central panel section and terminating at a forward position forward of the plane so as to face toward the left side, and the right central panel section extending from the right end panel section inwardly and forwardly at a fourth angle relative to the right end extension plate measured on a forward side of the right central panel section and terminating at a forward position forward of the plane so as to face toward the right side, the first angle being greater than the third angle, and the second angle being greater than the fourth angle.

2. The angled patch panel according to claim 1, wherein the first angle and the second angle are at least 75 degrees but less than 90 degrees, and the third angle and the fourth angle are not greater than least 60 degrees.

3. The angled patch panel according to claim 1, wherein the left and right end panel sections and the left and right central panel sections are formed from a unitary elongated element.

4. The angled patch panel according to claim 1, wherein the left mounting plate and the left end extension plate are formed from a first unitary elongated element, and the right mounting plate and the right end extension plate are formed from a second unitary elongated element.

5. The angled patch panel according to claim 1, wherein the angle between the left central panel section and the right central panel section is at least 120 degrees.

6. The angled patch panel according to claim 1, wherein the connector mounting apertures of the left and right end panel sections and the left and right central panel sections are each configured to receive an insert module, and wherein the angled patch panel further comprises an insert module positioned in each of the connector mounting apertures.

7. The angled patch panel according to claim 6, wherein each of the insert modules is contains at least one connector.

8. An angled patch panel assembly, comprising:
   (a) a rack that includes left and right side spaced-apart rack support members; and
   (b) an angled patch panel mounted to the left and right side rack support members, the angled patch panel including:
   left and right end panel sections, each having left and right ends and at least one connector mounting aperture;
   left and right central panel sections, each having left and right ends and at least one connector mounting aperture, the left central panel section being positioned to the right of the left end panel section and the right central panel section being positioned to the left of the right end panel section, the left end of the left central panel section and the right end of the left end panel section being rigidly attached together and the right end of the right central panel section and the left end of the right end panel section being rigidly attached together, and the right end of the left central panel section and the left end of the right central panel section being rigidly attached together at an angle less than 180 degrees measured on a rearward side thereof;
   left and right mounting plates, the left mounting plate mounted to the left side rack support member and the right mounting plate mounted to the right side rack support member, the left and right mounting plates defining a plane; and
   left and right end extension plates, the left end extension plate extending rearwardly from the left mounting plate to the left end of the left end panel section and being rigidly attached to the left mounting plate and to the left end of the left end panel section, and the right end extension plate extending rearwardly from the right mounting plate to the right end of the right end panel section and being rigidly attached to the right mounting plate and to the right end of the right end panel section, the left end panel section extending from the left end extension plate inwardly and forwardly at a first angle relative to the left end extension plate measured on a forward side of the left end panel section and terminating at a forward position rearward of the plane so as to face toward the left side, and the right end panel section extending from the right end extension plate inwardly and forwardly at a second angle relative to the right end extension plate measured on a forward side of the right end panel section and terminating at a forward position rearward of the plane so as to face toward the right side, the left central panel section extending from the left end panel section inwardly and forwardly at a third angle relative to the left end extension plate measured on a forward side of the left central panel section and terminating at a forward position forward of the plane so as to face toward the left side, and the right central panel section extending from the right end panel section inwardly and forwardly at a fourth angle relative to the right end extension plate measured on a forward side of the right central panel section and terminating at a forward position forward of the plane so as to face toward the right side, the first angle being greater than the third angle, and the second angle being greater than the fourth angle.

9. The angled patch panel assembly according to claim 8, wherein the first angle and the second angle are at least 75 degrees but less than 90 degrees, and the third angle and the fourth angle are not greater than least 60 degrees.

10. The angled patch panel assembly according to claim 8, wherein the left and right end panel sections and the left and right central panel sections are formed from a unitary elongated element.

11. The angled patch panel assembly according to claim 8, wherein the left mounting plate and the left end extension plate are formed from a first unitary elongated element, and the right mounting plate and the right end extension plate are formed from a second unitary elongated element.

12. The angled patch panel according to claim 8, wherein the angle between the left central panel section and the right central panel section is at least 120 degrees.

13. The angled patch panel assembly according to claim 8, wherein the connector mounting apertures of the left and right end panel sections and the left and right central panel sections are each configured to receive an insert module, and wherein the angled patch panel further comprises an insert module positioned in each of the connector mounting apertures.

14. The angled patch panel assembly according to claim 13, wherein each of the insert modules contains at least one connector.

15. An angled patch panel mountable to left and right side support members, comprising:
left and right end panel sections, each having left and right ends and at least one connector mounting aperture;
left and right central panel sections, each having left and right ends and at least one connector mounting aperture, the left central panel section being positioned to the right of the left end panel section and the right central panel section being positioned to the left of the right end panel section, the left end of the left central panel section and the right end of the left end panel section being attached together and the right end of the right central panel section and the left end of the right end panel section being attached together, and the right end of the left central panel section and the left end of the right central panel section being attached together at an angle less than 180 degrees measured on a rearward side thereof;
left and right mounting plates, the left mounting plate being configured for mounting to the left side support member and the right mounting plate being configured for mounting to the right side support member; and
left and right end extension plates, the left end extension plate extending rearwardly from the left mounting plate to the left end of the left end panel section and being attached to the left mounting plate and to the left end of the left end panel section, and the right end extension plate extending rearwardly from the right mounting plate to the right end of the right end panel section and being attached to the right mounting plate and to the right end of the right end panel section, the left end panel section extending from the left end extension plate inwardly and forwardly at a first angle relative to the left end extension plate measured on a forward side of the left end panel section and terminating at a first forward position so as to face toward the left side, and the right end panel section extending from the right end extension plate inwardly and forwardly at a second angle relative to the right end extension plate measured on a forward side of the right end panel section and terminating at a second forward position so as to face toward the right side, the left central panel section extending from the left end panel section inwardly and forwardly at a third angle relative to the left end extension plate measured on a forward side of the left central panel section and terminating at a third forward position so as to face toward the left side, and the right central panel section extending from the right end panel section inwardly and forwardly at a fourth angle relative to the right end extension plate measured on a forward side of the right central panel section and terminating at a fourth forward position so as to face toward the right side, the third forward position being forward of the first forward position, the fourth forward position being forward of the second forward position, the first angle being greater than the third angle, and the second angle being greater than the fourth angle.

16. The angled patch panel according to claim 15, wherein the first angle and the second angle are at least 75 degrees but less than 90 degrees, and the third angle and the fourth angle are not greater than least 60 degrees.

17. The angled patch panel according to claim 15, wherein the angle between the left central panel section and the right central panel section is at least 120 degrees.

18. The angled patch panel according to claim 15, wherein the connector mounting apertures of the left and right end panel sections and the left and right central panel sections are each configured to receive an insert module, and wherein the angled patch panel further comprises an insert module positioned in each of the connector mounting apertures.

19. The angled patch panel according to claim 18, wherein each of the insert modules contains at least one connector.

20. The angled patch panel according to claim 18, wherein each of the insert modules contains at least six linearly aligned connectors.

21. An angled patch panel mountable to left and right side support members, comprising:
left and right end panel sections, each having left and right ends and at least one connector mounting aperture;
left and right central panel sections, each having left and right ends and at least one connector mounting aperture, the left central panel section being positioned to the right of the left end panel section and the right central panel section being positioned to the left of the right end panel section, the left end of the left central panel section and the right end of the left end panel section being attached together at an angle other than 180 degrees and the right end of the right central panel section and the left end of the right end panel section being attached together at an angle other than 180 degrees, and the right end of the left central panel section and the left end of the right central panel section being attached together at an angle other than 180 degrees;

left and right mounting plates, the left mounting plate being configured for mounting to the left side support member and the right mounting plate being configured for mounting to the right side support member; and left and right end extension plates, the left end extension plate extending rearwardly from the left mounting plate to the left end of the left end panel section and being attached to the left mounting plate and to the left end of the left end panel section, and the right end extension plate extending rearwardly from the right mounting plate to the right end of the right end panel section and being attached to the right mounting plate and to the right end of the right end panel section, the left end panel section extending from the left end extension plate inwardly and forwardly and terminating at a first forward position and facing toward the left side, and the right end panel section extending from the right end extension plate inwardly and forwardly and terminating at a second forward position and facing toward the right side, the left central panel section extending from the left end panel section inwardly and forwardly and terminating at a third forward position and facing toward the left side, and the right central panel section extending from the right end panel section inwardly and forwardly and terminating at a fourth forward position and facing toward the right side, the third forward position being forward of the first forward position, the fourth forward position being forward of the second forward position.

22. The angled patch panel according to claim 21, wherein the connector mounting apertures of the left and right end panel sections and the left and right central panel sections are each configured to receive an insert module, and wherein the angled patch panel further comprises an insert module positioned in each of the connector mounting apertures.

23. The angled patch panel according to claim 22, wherein each of the insert modules contains at least one connector.

* * * * *